US010082560B2

(12) United States Patent
Murray et al.

(10) Patent No.: US 10,082,560 B2
(45) Date of Patent: Sep. 25, 2018

(54) SENSOR RECEIVER NULLS AND NULL STEERING

(71) Applicant: PGS Geophysical AS, Oslo (NO)

(72) Inventors: Paul Edwin Murray, Katy, TX (US); Robert Alexis Peregrin Fernihough, Jarrell, TX (US)

(73) Assignee: PGS Geophysical AS, Oslo (NO)

( * ) Notice: Subject to any disclaimer, the term of this patent is extended or adjusted under 35 U.S.C. 154(b) by 450 days.

(21) Appl. No.: 14/818,932

(22) Filed: Aug. 5, 2015

(65) Prior Publication Data
US 2016/0109596 A1 Apr. 21, 2016

Related U.S. Application Data

(60) Provisional application No. 62/065,213, filed on Oct. 17, 2014.

(51) Int. Cl.
G01S 5/22 (2006.01)
G01S 15/87 (2006.01)
G01S 15/88 (2006.01)
G01V 1/36 (2006.01)

(52) U.S. Cl.
CPC ............. *G01S 5/22* (2013.01); *G01S 15/876* (2013.01); *G01S 15/88* (2013.01); *G01V 1/36* (2013.01); *G01V 2210/32* (2013.01); *G01V 2210/324* (2013.01); *G01V 2210/3246* (2013.01)

(58) Field of Classification Search
CPC ............. G01V 1/36; G01V 2210/3246; G01V 2210/32; G01V 2210/324; G01S 15/876; G01S 15/88; G01S 5/22
See application file for complete search history.

(56) References Cited

U.S. PATENT DOCUMENTS 2,757,356 A 7/1956 Haggerty
5,142,501 A * 8/1992 Winterstein ........... G01V 1/284
367/75

(Continued)

OTHER PUBLICATIONS

1. Roux, "Passive seismic imaging with directive ambient noise: application to surface waves and the San Andreas Fault in Parkfield, CA" Geophys. J. Int. (2009) 179, 367-373. (Year: 2009).*

(Continued)

*Primary Examiner* — Krystine E Breier

(57) ABSTRACT

A method. In one embodiment there is provided a method in which a direction from a sensor position to a noise source is determined. A coordinate rotation is applied to a first set of signal values, wherein each signal value of the first set of signal values is based on an output of a corresponding component of a three-component particle motion sensor at the sensor position. The applying generates a rotated set of signal values. The coordinate rotation comprises a coordinate rotation transforming a first set of coordinate axes to a second set of coordinate axes, wherein the first set of coordinate axes has each coordinate axis aligned with a corresponding component of the three-component particle motion sensor at the sensor position, and the second set of coordinate axes comprises a first axis pointed in a direction opposite the direction from the sensor position to the noise source.

11 Claims, 10 Drawing Sheets

(56) References Cited

U.S. PATENT DOCUMENTS

| | | | |
|---|---|---|---|
| 6,061,298 A * | 5/2000 | Madtson | G01V 1/284 367/21 |
| 6,205,403 B1 * | 3/2001 | Gaiser | G01V 1/16 702/14 |
| 6,553,315 B2 * | 4/2003 | Kerekes | G01V 1/003 702/14 |
| 7,359,283 B2 * | 4/2008 | Vaage | G01V 1/3808 367/24 |
| 7,889,597 B2 * | 2/2011 | Gratacos | G01V 1/286 367/38 |
| 8,456,950 B2 * | 6/2013 | Hegna | G01V 1/364 367/21 |
| 9,016,129 B2 | 4/2015 | McConnell et al. | |
| 9,310,503 B2 * | 4/2016 | Rentsch | G01V 1/36 |
| 9,535,181 B2 * | 1/2017 | Poole | G01V 1/36 |

OTHER PUBLICATIONS

Schneider, W. A., et al., Ocean-Bottom Seismic Measurements off the California Coast, Journal of Geophysical Research, vol. 69, No. 6, Mar. 15, 1964, pp. 1135-1143.

Barr, Fred J. et al., Attenuation of Water-col. Reverberations Using Pressure and Velocity Detectors in a Water-Bottom Cable, SET Technical Program Expanded Abstracts, Jan. 1989, pp. 653-656.

Dragoset, Bill, et al., Ocean-Bottom Cable Dual-Sensor Scaling, Expanded Abstracts of 64th Annual SEG Meeting, 1994, pp. 857-860.

Paffenholz, Josef et al., An Improved Method for Deriving Water-Bottom Reflectivities for Processing Dual-Sensor Ocean-Bottom Cable Data, Expanded Abstracts paper SA3.2, 65th Annual Meeting of the Society of Exploration Geophysicists, 1995, pp. 987-990.

Ball, Vaughn et al., Dual-Sensor Summation of Noisy Ocean-Bottom Data, 66th Annu. SEG Int. Abts. (Denver) Nov. 10, 1996, vol. 1, pp. 28-31, ACQ1 8.

Kluver, Tilman, et al., A Robust Strategy for Processing 3K Dual-Sensor Towed Streamer Data, SEG Houston 2009 International Exposition and Annual Meeting, 2009, pp. 3088-3092.

Duren, Richard E., Sideswipe Removal Via Null Steering, Geophysics, vol. 57, No. 12, Dec. 1992, pp. 1623-1632.

Soubaras, Robert, Pre-Stack Deghosting for Variable-Depth Streamer Data, SEG Las Vegas 2012 Annual Meeting, 2012, pp. 1-5.

* cited by examiner

SENSOR RECEIVER NULLS AND NULL STEERING

CROSS-REFERENCE TO RELATED APPLICATIONS

This application claims the benefit of U.S. Provisional Application Ser. No. 62/065,213 filed Oct. 17, 2014 and titled "Creating Receiver Nulls and Null Steering with Multicomponent Sensors for Directional Wavefield Separation and Directional Broadband Noise Reduction". The provisional application is incorporated by reference herein as if reproduced in full below.

BACKGROUND

Geophysical surveying (e.g., seismic, electromagnetic) is a technique where two-or three-dimensional "pictures" of the state of an underground formation are taken. Geophysical surveying takes place not only on land, but also in marine environments (e.g., ocean, large lakes). Marine geophysical survey systems use a plurality of sensor cables, which contain one or more sensors to detect acoustic energy emitted by one or more sources and returned from a hydrocarbon reservoir and/or associated subsurface formations beneath the sea floor. Sensor cables, in some embodiments may comprise sensor streamers which may be towed through a water body by a survey vessel, and in other embodiments ocean bottom cables disposed on the sea floor or entrenched within the seabed. Detection and interpretation of the signals represented thereby can be complicated by reflections of the energy from interfaces present in the marine environment, particularly the water-air interface at the surface of the sea or similar water body. Similarly, the detection and interpretation of such signals may be complicated by acoustic noise emitted by sources in the marine environment.

Discrimination against reflected signals or noise sources may be provided by combining signals from multiple detector types sensitive to different physical characteristics of the acoustic signal. For example, when appropriately combined, the output from hydrophones sensitive to the pressure perturbation from the acoustic signal may be used in conjunction with the output of a particle motion sensor sensitive to the velocity of a particle for example, a geophone, may provide such discrimination. Further, when appropriately combined with the output of a three-component particle motion sensor, discrimination against reflected signals and/or noise sources may be provided based on the directional properties of the signals or noise sources.

BRIEF DESCRIPTION OF THE DRAWINGS

For a detailed description of exemplary embodiments, reference will now be made to the accompanying drawings in which.

NOTATION AND NOMENCLATURE

Figure 1:
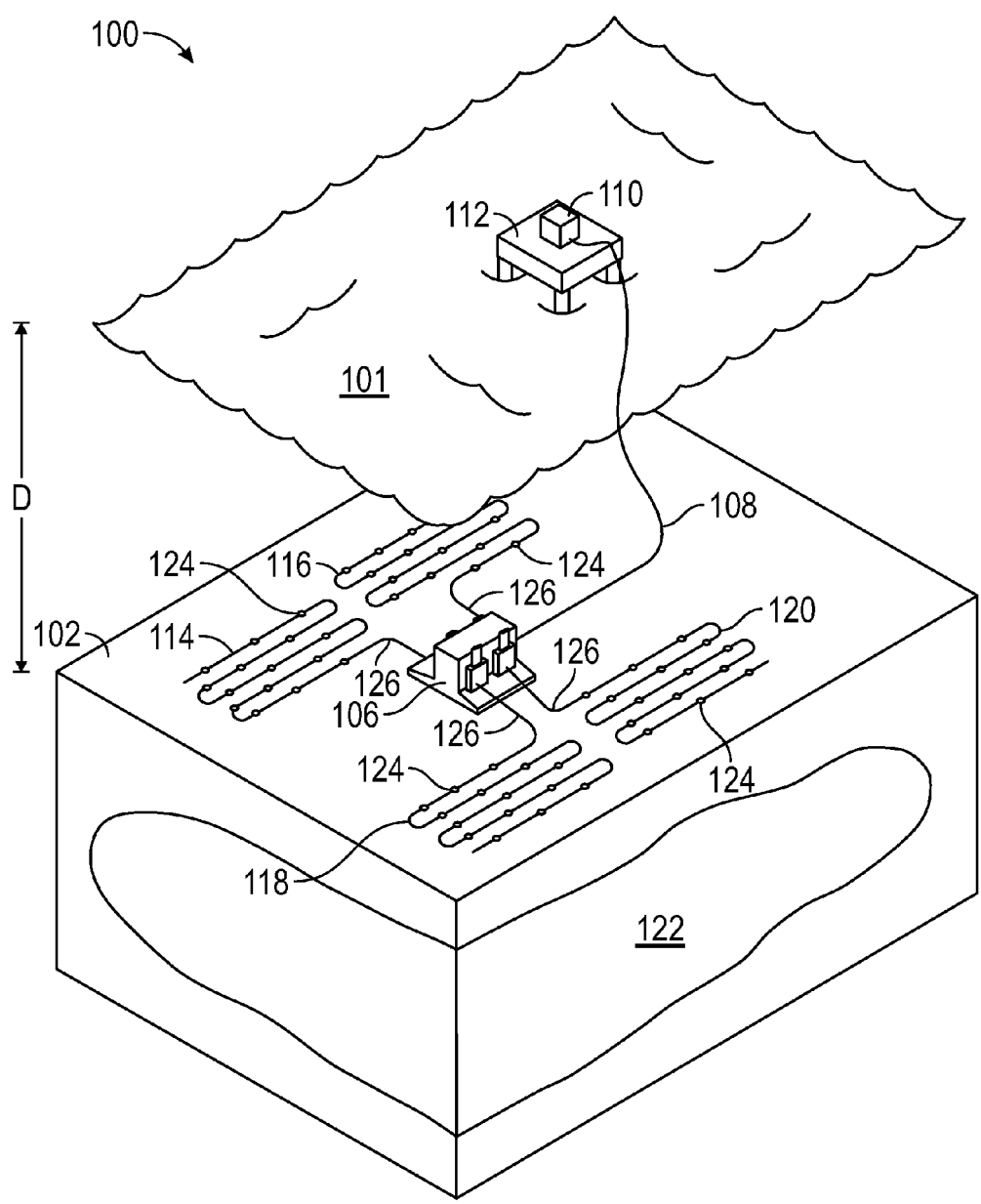
FIG. 1 shows a partial cutaway perspective view of a marine geophysical survey environment in accordance with at least some embodiments.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, load carrying member that also comprises electrical conductors and/or optical conductors for carrying electrical power and/or electrical signals and/or optical power and/or optical signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Particle motion sensor" shall mean a class of sensors whose output signals are responsive to displacement, velocity, and/or acceleration of a particle proximate to the sensor. Thus, the term "particle motion sensor" includes geophones and accelerometers, including accelerometers embodied as microelectromechanical systems (MEMS) devices, or optical accelerometers. Also included is an accelerometer embodied as described in the commonly-owned, pending U.S. patent application Ser. No. 14/145,093, titled "Piezoelectric Accelerometer" which is hereby incorporated by reference as if fully set forth herein.

"Multi-axis particle motion sensor" shall mean a particle motion sensor whose output signals are responsive to displacement, velocity, and/or acceleration of the sensor in two or more directions.

"Three-component (3-C) particle motion sensor" shall mean a multi-axis particle motion sensor whose output signals are responsive to displacement, velocity, and/or acceleration of the sensor in three directions that may, but need not, be orthogonal, but are non-coplanar. Three-component sensors include but are not limited to gyroscopes, or similar devices, responsive to particle motions comprising a three-component center-of-mass motion and a three-component rotation about the center-of-mass (which may also be referred to as a six-component or 6-C, sensor). Other example embodiments of a 3-C particle motion sensor include three pairs of hydrophones arranged to determine a pressure gradient along directions comprising respective axes between the members of each hydrophone pair configured so that the directions are non-coplanar.

"Hydrophone" shall mean a class of sensors whose output signals are responsive to pressure changes proximate to the hydrophone.

"Co-located" as used in conjunction with two or more sensors shall mean within 0.1 wavelength of a seismic acoustic signal proximate to the sensors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims, is limited to that embodiment.

FIG. 1 shows a perspective cut-away view of a portion of a marine geophysical survey environment 100. In particular, FIG. 1 shows the surface 101 of the water. At a distance D below the surface 101 resides the sea floor 102, and below the sea floor 102 resides a hydrocarbon reservoir 122.

Within the environment of FIG. 1 a base unit 106 may be installed on sea floor 102 which mechanically and communicatively couples to an umbilical cable 108 that extends from the base unit 106 to a computer system 110 at the surface. Umbilical cable 108 may comprise an electronic communication link to computer system 110, an optical fiber link, or both. In the example system of FIG. 1, the computer system 110 may reside on a vessel 112 floating on the surface 101. The computer system may be used to perform at least a portion of the various signal data processing in accordance with embodiments of the disclosure described further below. The vessel 112 is illustratively shown as a floating platform, but other surface vessels may be used (e.g., ships, barges, or platforms anchored or mounted to the sea floor). By way of the umbilical cable 108, the base unit 106, as well as the various sensor cables 114, 116, 118 and 120 are communicatively coupled to the computer system 110.

Each of sensor cables 114, 116, 118 and 120 comprise a plurality of seismic sensors 124. For ease of illustration only fifteen seismic sensors 124 are shown associated with sensor cables 114, for example. However, in practice many hundreds or thousands of such devices may be spaced along the sensor cable 114. The seismic sensors 124 need not, however, be evenly spaced along the sensor cables, and extended portions of the sensor cables may be without seismic devices. For example, lead-in portions 126 may have expanses within which no seismic sensors are located. As described further below, each seismic sensor 124 may comprise co-located particle motion sensor and a hydrophone.

Figure 2:
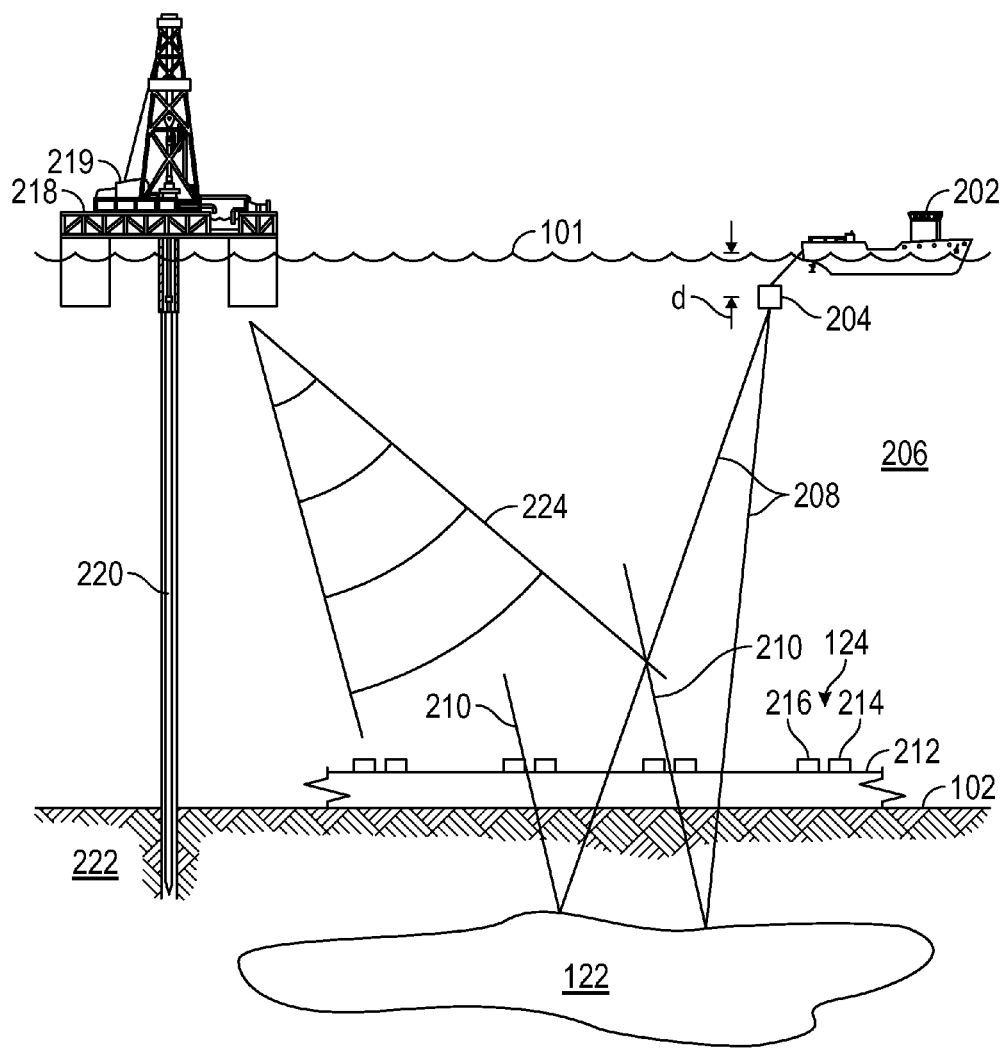
FIG. 2 shows a side elevation view of marine survey in accordance with at least some embodiments.

Turning now to FIG. 2, a marine survey in accordance with at least some embodiments is shown. A survey vessel 202 tows a seismic source 204 through a water body 206. Seismic source 204 may be towed at a depth, d, below surface 101. Seismic source 204 drives seismic acoustic signals 208 in water body 206. The seismic acoustic signals propagate through water body 206 and sea floor 102 and reflect off of hydrocarbon bearing reservoir 122. Further, reflections may occur from other subsurface targets of interest (not shown in FIG. 2), such as overburden and the geology underlying hydrocarbon reservoir 122. Reflected seismic acoustic signals 210 may then be detected by seismic sensors disposed on an ocean bottom cable. For example, FIG. 2 shows a portion 212 of such an ocean bottom sensor cable deployed on sea floor 102 having sensors 124 disposed thereon. Portion 212 maybe a portion of a sensor cable such as one of sensor cables 114, 116, 118 and 120, FIG. 1. Thus, portion 212 may be communicatively coupled to a base unit (not shown in FIG. 2) and thence to a computer system coupled to the base unit by an umbilical extending to the surface, as described above. Each sensor 124 may comprise a co-located hydrophone 214 and a particle motion sensor 216. Further, particle motion sensors 216 may comprise multi-axis particle motion sensors, and in at least some embodiments a three-component particle motion sensor.

In addition to seismic acoustic signals 208, marine environmental noise may be present in water body 206. A drill platform 218 located in the vicinity of the ocean bottom sensor cables represents one such a source of noise, but is not necessarily the only noise source. For example, machinery 219 on drill platform 218 associated with the drilling of a well bore 220 into sea bed 222 may generate vibrations that are coupled through drill platform 218 into water body 206 and transmitted through water body 206 as acoustic noise 224. Acoustic noise 224 may then impinge on sensors 124 and be detected by the hydrophones 214 and particle motion sensors 216 comprising sensors 124. Although drill platform 218 exemplifies a potential source of noise, other noise sources, such as marine vessels traveling in water body 206 may generate noise that reaches the sensors.

Thus, hydrophones 214 may output a signal proportional to the pressure fluctuations associated with an acoustic signal proximate to the hydrophone. These pressure fluctuations may represent superimposed reflected seismic acoustic signals 210 and acoustic noise 224. Likewise, particle motion sensors 216 may output one or more signals proportional to the motion of a particle associated with an acoustic signal proximate to the particle motion sensor. The particle motion may, for example, comprise the motion of a fluid particle proximate to the particle motion sensor or the motion of a particle comprising the seabed proximate to the particle motion sensor. In particular a 3-C particle motion sensor 216 may output three signals, each proportional to a component of the motion of a particle along a respective one of the three axes of the 3-C particle motion sensor. These particle motions may comprise superimposed reflected seismic acoustic signals 210 and acoustic noise 224.

Figure 2A:
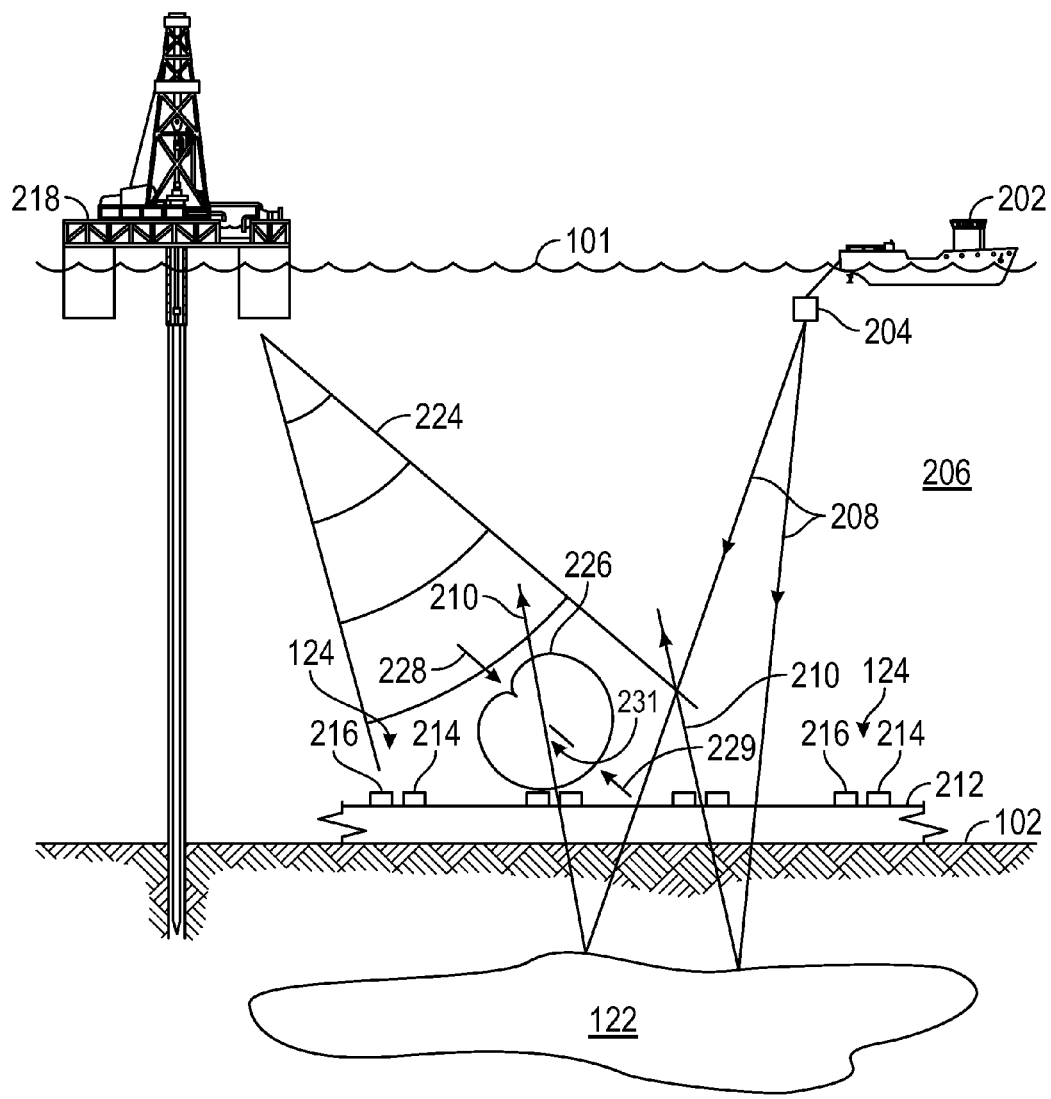
FIG. 2A shows a side elevation view of marine survey in accordance with at least some embodiments.

The output signals from the hydrophones 214 and particle motion sensors 216 may be communicated to a computer system on a vessel located on the surface as described above. The output signals may be processed by the computer system to provide a mechanism to discriminate between the reflected seismic acoustic signals 210 and acoustic noise 224. Thus, for example, by appropriately combining the output signals from the hydrophones 214 and particle motion sensors 216, as described further below in conjunction with FIG. 3, a null, or effective minimum, may be created in the sensitivity of seismic sensors 124 in the direction of a noise source, e.g. drill platform 218. This may be further understood by referring to FIG. 2A illustrating the marine survey of FIG. 2 in which a sensor directivity pattern 226 has a null direction 228 opposite a direction from a sensor 124 to a noise source, represented by drill platform 218. Further, directivity pattern 226 may have a direction of maximum sensitivity 229 opposite the direction 228 of the null. In practice, the null, or effective minimum, may not be "infinitely" deep as represented in FIG. 2A, but may be effective having a depth greater than or equal to a preselected value. For example, as discussed further below, in at least some embodiments, the null, or effective minimum, may have a depth of 21 decibels (dB).

Returning to FIG. 1, in at least some embodiments, one or more of sensor cables 114, 116, 118 and 120 may be left permanently in place to enable repeat surveys of the subsurface region hydrocarbon bearing reservoir 122. Such repeat surveys enable the tracking of the movement of reservoir fluids, for example. Further, between surveys, it may be desirable to passively monitor microseismic noise emitted by hydrocarbon bearing reservoir 122 or other subsurface targets, such as the overburden, as described above. The microseismic noise may be small relative to acoustic noise in the marine environment described above. However, in a passive monitoring embodiment having a sensor directivity pattern such as sensor directivity pattern 226, acoustic noise may be reduced similar to the active marine survey of FIGS. 2 and 2A.

Figure 2B:
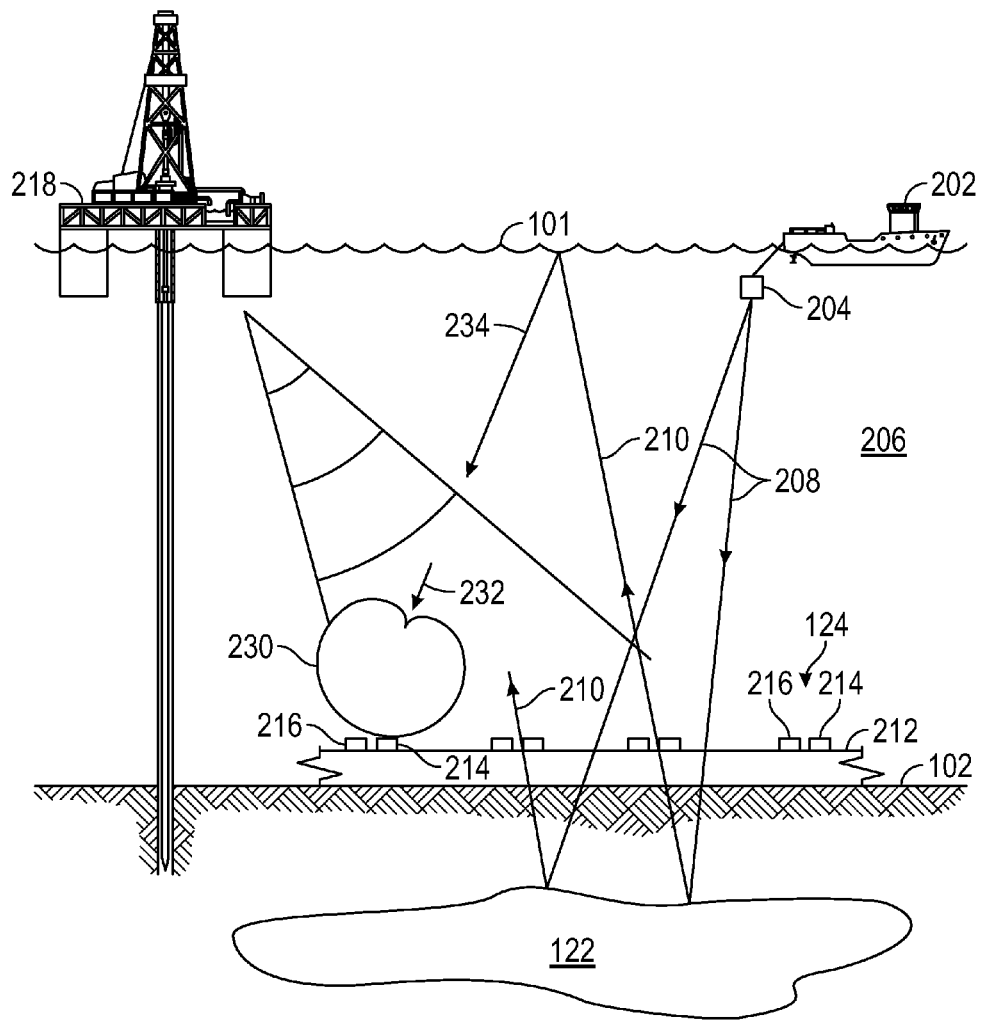
FIG. 2B shows a side elevation view of marine survey in accordance with at least some embodiments.

In addition to acoustic noise, the output signals may be processed to generate a null in the sensitivity of seismic sensors to discriminate against seismic acoustic waves reflected from the acoustic interface between the water body and the atmosphere at the surface of the water body. (Surface-reflected seismic acoustic signals may alternatively be referred to as surface-related multiples, free-surface multiples or water-layer multiples.) Such an embodiment is shown in FIG. 2B illustrating the marine survey of FIG. 2 in which a sensor directivity pattern 230 is shown. Sensor directivity pattern 230 may be generated as described below in conjunction with FIG. 6 having a null direction 232 in the direction of propagation of surface-reflected seismic acoustic signals 234. Sensor directivity patterns 226 and 230 are illustrative examples of a null steering mechanism which may be effected as now described in conjunction with FIG. 3.

Figure 3:
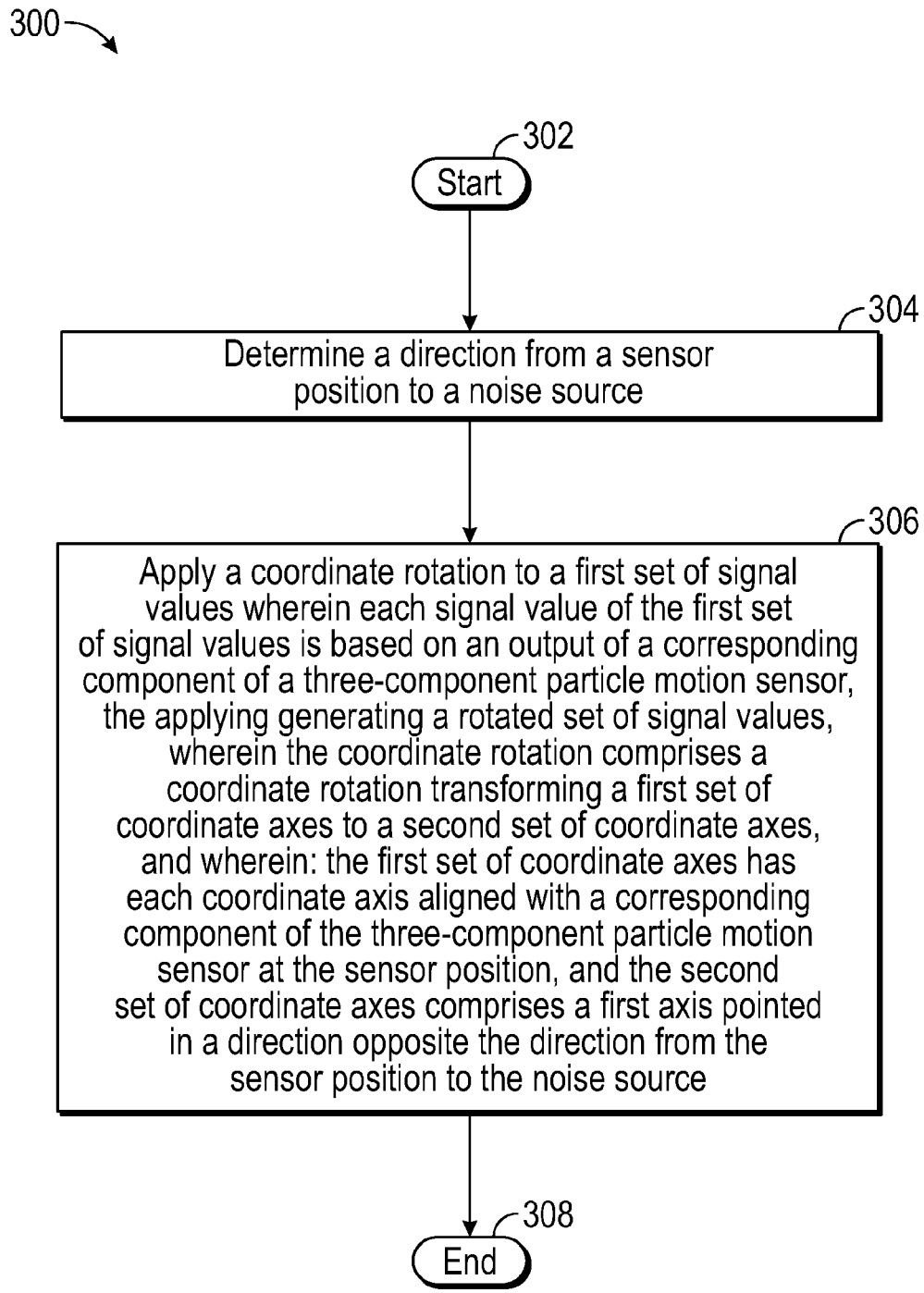
FIG. 3 shows a flow chart of a method in accordance with at least some embodiments.

Turning now to FIG. 3, there is shown a flow chart of a process 300 in accordance with at least some embodiments. Process 300 starts at block 302. In block 304 a direction from a sensor position to a noise source is determined. The direction may be determined from, for example, the known sensor position and known noise source position in a reference coordinate system such as a North-East-Vertical (N,E,V) coordinate system. In block 306 a coordinate rotation is applied to a first set of signal values, each signal value of the first set of signal values based on an output of a corresponding component of a three-component (3-C) particle motion sensor; the applied coordinate rotation generating a second set of signal values. The applied coordinate rotation comprises a coordinate rotation transforming a first set of coordinate axes to a second set of coordinate axes. Further, the first set of coordinate axes comprises a set of coordinate axes aligned with a corresponding component of the three-component particle motion sensor at the sensor position, and the second set of coordinate axes comprises a first axis pointed in a direction opposite the direction from the sensor position to the noise source, the coordinate rotation transforming the first set of coordinate axes to the second set of coordinate axes.

Figure 3A:
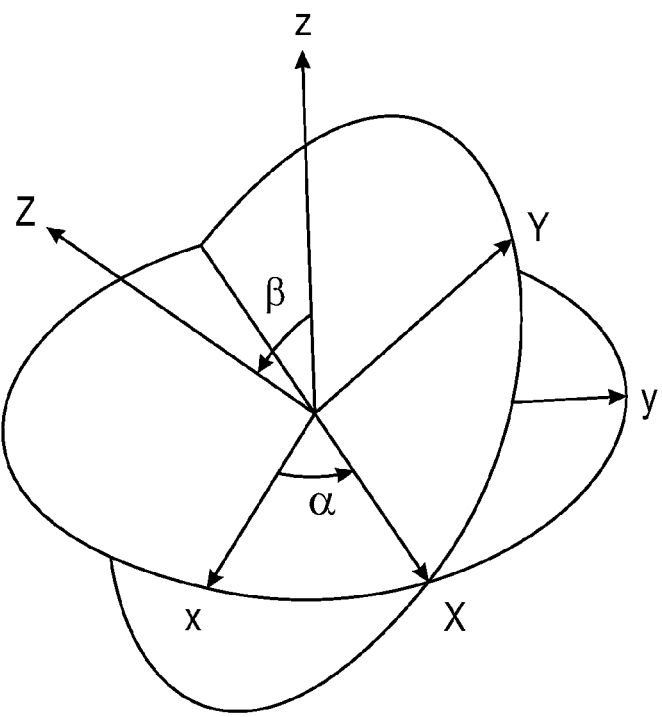
FIG. 3A shows a coordinate system rotation associated with the method of FIG. 3.

Such a coordinate rotation may be effected by the composite of two rotations, as illustrated in FIG. 3A showing an exemplary rotation from the (x,y,z) coordinate system to the (X,Y,Z) coordinate system. For example, the x, y, z axes may correspond to the axes of a 3-C particle motion sensor, and the Z-axis may correspond to the direction opposite the direction from the sensor position to the noise source. The rotation from the (x,y,z) coordinate axes to the (X,Y,Z) coordinate axes may be effected by a rotation by the angle $\alpha$ about the z-axis, and then by a further rotation by the angle $\beta$ about the X-axis. Mathematically, the rotation of coordinate axes may be implemented by matrix multiplication by two rotation matrices, $R(\alpha)$ and $R(\beta)$, defined by Equations (1) and (2):

$$R(\alpha) = \begin{bmatrix} \cos\alpha & \sin\alpha & 0 \\ -\sin\alpha & \cos\alpha & 0 \\ 0 & 0 & 1 \end{bmatrix} \quad (1)$$

$$R(\beta) = \begin{bmatrix} \cos\beta & 0 & -\sin\beta \\ -0 & 1 & 0 \\ \sin\beta & 0 & \cos\beta \end{bmatrix}. \quad (2)$$

Thus, for example, a vector, v having components $(v_x, v_y, v_z)$ in the (x,y,z) coordinate system transforms to a vector V having components $(V_X, V_Y, V_Z)$ in the (X,Y,Z) coordinate system determined by $V = R \cdot v \equiv R(\beta) \cdot R(\alpha) \cdot v$. Similarly, the first set of signals may be considered a vector, $v_s$ comprising the corresponding outputs from each of the components of the particle motion sensor. Thus, in the example of a 3-C motion sensor, the vector $v_s$ includes three components. The second set of signals may then comprise the vector $V_s$ determined by applying the rotations as set forth above. In the foregoing example, the rotation, R, has been parameterized by two angles, $\alpha$, $\beta$ for ease of understanding. It would be understood by those skilled in the art with the benefit of the disclosure, that in general, a rotation in three dimensions may be parameterized by three angles, depending on for example, the rotational conventions and conventions for the angles themselves. Further, the rotation, R, may alternatively be defined by a single rotation angle, say $\zeta$, about an axis of rotation, T, a unit vector defined in the (x,y,z) coordinate system. For example, the rotation, R, of an arbitrary vector v by the angle $\zeta$ about the axis defined by the unit vector T may be expressed in vector notation as:

$$Rv = v + (\sin \zeta)(T \times v) + (1 - \cos \zeta)((v \cdot T)T - v) \quad (3).$$

In particular, if Equation 3 is applied to each of the unit vectors along the orthogonal coordinate axes (x, y, z) of the un-rotated coordinate system, the resulting vectors Rv define the respective unit vectors of the rotated coordinate system in terms of their components in the un-rotated coordinate system. In Equation 3, the operators "x" and "■" are the standard vector cross and dot products, respectively. It would be appreciated by those of ordinary skill in the art with the benefit of the disclosure that other, equivalent representations of the rotation, R, such as a matrix representation may be used.

Further, a signal value in the second set of signals corresponding to the first axis in the second set of coordinate axes is summed with an appropriately scaled, as described below, output signal from a co-located hydrophone at the sensor position, the summing generating a sum output signal. Thus, in the example of FIG. 3A, if the Z-axis corresponds to the direction opposite the direction from the sensor position to the noise source, the signal value in the second set of signals may be the Z-component in the second set of signals. the scaling and summing may be viewed as analogous to the PZ summation or up-down separation in which the particle motion is taken to be vertical. However, one of ordinary skill in the art having the benefit of the disclosure would appreciate that the embodiments herein need not be confined to vertical particle motions. Method 300 ends at block 308.

Figure 3B:
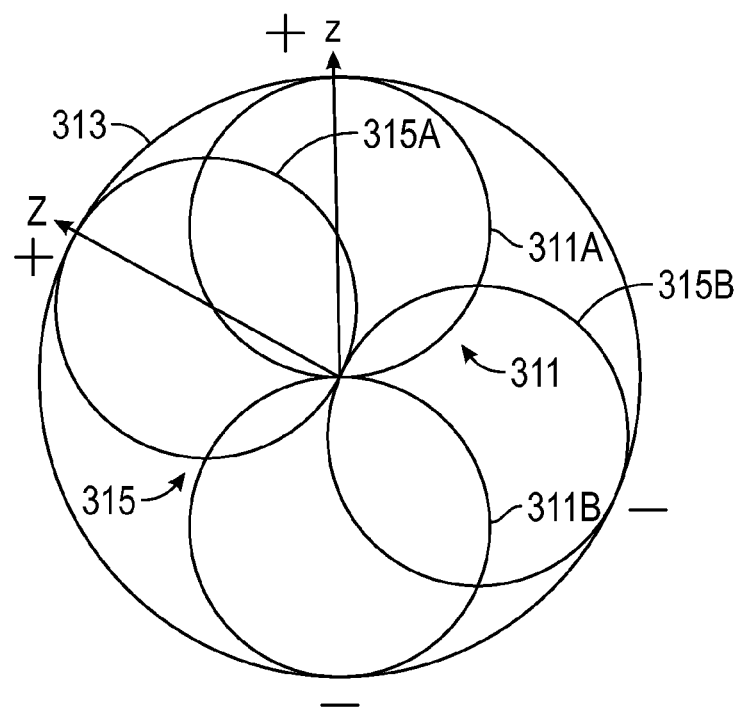
FIG. 3B shows a directivity pattern associated with the method of FIG. 3.
Figure 3C:
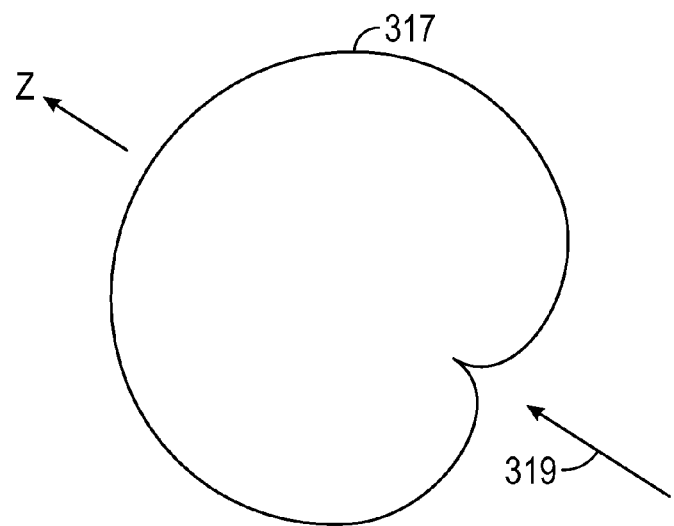
FIG. 3C shows a directivity pattern associated with the method of FIG. 3.

In this way, a null in the sensitivity of a sensor comprising a multi-axis particle motion sensor and a co-located hydrophone may be steered in the direction of the noise source. This may be further appreciated by referring to FIGS. 3B and 3C illustrating a directivity pattern of one component of a particle motion sensor. In FIG. 3B, "figure 8" directivity pattern 311 corresponds to a component of a multi-axis particle motion sensor. Directivity pattern 311 may be aligned with the z-axis in the coordinate system in FIG. 3A. A directivity pattern corresponding to a hydrophone sensitive to pressure fluctuations, or changes, associated with an acoustic signal, which is a scalar quantity, may be isotropic, as in directivity pattern 313. Further, a polarity may be associated with each lobe 311A, 311B of directivity pattern 311. For example, the particle motion sensor may be configured to output a positive signal, e.g. a positive voltage, in response to a particle velocity in the positive-z direction, and a negative signal in response to a particle velocity in the negative-z direction, as illustrated by the "+" and "−" symbols in FIG. 3A. It would be appreciated by those of ordinary skill in the art having the benefit of the disclosure, that these sign conventions are a matter choice and may be chosen in the opposite sense, for example. Application of the rotation of coordinate axes from the (x, y, z) coordinate system to the (X, Y, Z) coordinate system described above may then effect the rotation to the directivity pattern of the particle motion sensor to directivity pattern 315 having lobes 315A and 315B aligned along the Z-axis which further aligns with the direction to the noise source. Algebraically combining the Z-component of the particle motion sensor signal with the isotropic hydrophone signal may then produce a sensor directivity pattern 317 having a null 319 in the direction of the noise source. By way of example, steering null 319 within 0.5° in all dimensions of a directional noise source may attenuate the noise by 21 dB or more.

In at least some embodiments, prior to the combining, the particle motion sensor signals and the hydrophone output signal may be filtered to remove the impulse response of the respective sensor. Further, one or both of the particle motion sensor output signals and the hydrophone output signal may be scaled to normalize the magnitude of the particle motion sensor signal and the hydrophone output signal. Stated differently, each of the magnitude of the three-component output signal from the particle motion sensor and the hydrophone output signal may be proportional to the particle velocity associated with the acoustic signal proximal to the sensors. For example, as previously described, a hydrophone may sense the fluctuations in fluid pressure associated with the acoustic wave (whether a seismic acoustic signal or acoustic noise; in an acoustic signal the pressure, p, and the particle velocity associated with the acoustic wave are related by $p = \rho \cdot c_s \cdot v_p$ where $\rho$ is the particle mass density, $c_s$ is the velocity of sound in the medium, e.g. sea water, and $v_p$ is the particle velocity associated with the acoustic wave. In this way, the particle velocity may be inferred from the hydrophone output signal. Alternatively, the hydrophone signal may be differentiated and the particle velocity derived using a transfer characteristic of the hydrophone transducer. Either, the particle motion sensor output signals, the hydrophone output signals, or both may thus be scaled, or normalized, such that the particle velocity inferred from both sensors is the same. Further, in an embodiment of a particle motion sensor sensitive to particle accelerations, the particle velocity may be derived by integrating the output of the particle motion sensor.

Further, referring again to FIG. 2A, the orientation of the maximum sensitivity direction 229 of directivity pattern 226 and an angle of incidence of reflected seismic acoustic signal 210, on sensor 124 may be different, as illustrated by the angular difference 231 in FIG. 2A. Thus, the sum output signal, at block 308, may be scaled by a so-called obliquity scalar based on this difference. In at least some embodiments, the obliquity scalar may be the cosine of the angular difference 231.

In the foregoing description, the 3-C particle motion sensor may have components aligned with the (x, y, z) coordinate axes. However, in at least some embodiments, the coordinate axes of the 3-C particle motion sensor may need to be determined with respect to a reference coordinate system, such as the aforesaid (N,E,V) coordinate system. For example, while sea floor 102, FIG. 2 has been shown as smooth and flat for ease of illustration, in practice sea floor 102 may comprise undulations, debris and the like giving rise to deviations from a flat surface. Consequently, while the positions of the sensor cables and the positions of the seismic sensors on the cables may be known, local deviations of the direction of the sensor cables, both horizontally and vertically due to irregularities in the sea floor may disturb the orientation of the particle motion sensors 216 within the seismic sensors 124.

Thus, the orientation of a 3-C motion sensor relative to a reference coordinate system may not, a priori, be known. Stated otherwise, the orientation of the (x,y,z) coordinate system in FIG. 3A, for example, may not be a priori known relative to the fixed reference coordinate system, such as the aforesaid (N,E,V) coordinate system. The orientation may be determined by measuring a seismic acoustic signal from a seismic source 204 at several known positions of the source along a survey path. The relative amplitude of the output signals from each of the mutually perpendicular sensing devices in a particle motion sensor 216, which may comprise a 3-C particle motion sensor, is proportional to respective direction cosines of a unit vector in the direction of the propagation vector of the seismic acoustic wave at the position of the particle motion sensor 216. Recall, direction cosines of a vector are the projection of the vector onto unit vectors of a set of coordinate axes, divided by the magnitude of the vector. A unit vector has magnitude 1. In an isotropic medium, such as sea water, seismic acoustic waves are longitudinally polarized. Thus, the particle motion associated with the seismic acoustic wave is parallel to the wave propagation vector.

The direction cosines may be referenced to a fixed coordinate system by operating on them using the rotation matrix between a local coordinate system in which the propagation vector of the seismic acoustic wave is parallel to one of the three mutually perpendicular axes. For example, the positions of a seismic source 124 may be based on a preselected coordinate system, such as the aforesaid North-East-Vertical (N,E,V) cartesian coordinate system. Likewise, the positions of the particle motion sensors 216 may be based on the preselected coordinate system. The (N,E,V) cartesian system is used herein for ease of understanding. Other preselected coordinate systems may be used, such as a cylindrical (radial-transverse-vertical) coordinate system. The transformation between such a coordinate system and a cartesian coordinate system such as the (N,E,V) coordinate system would be understood by those of ordinary skill in the art with the benefit of the disclosure and the N,E,V (or equivalent) cartesian system may be used without loss of generality.

Figure 4:
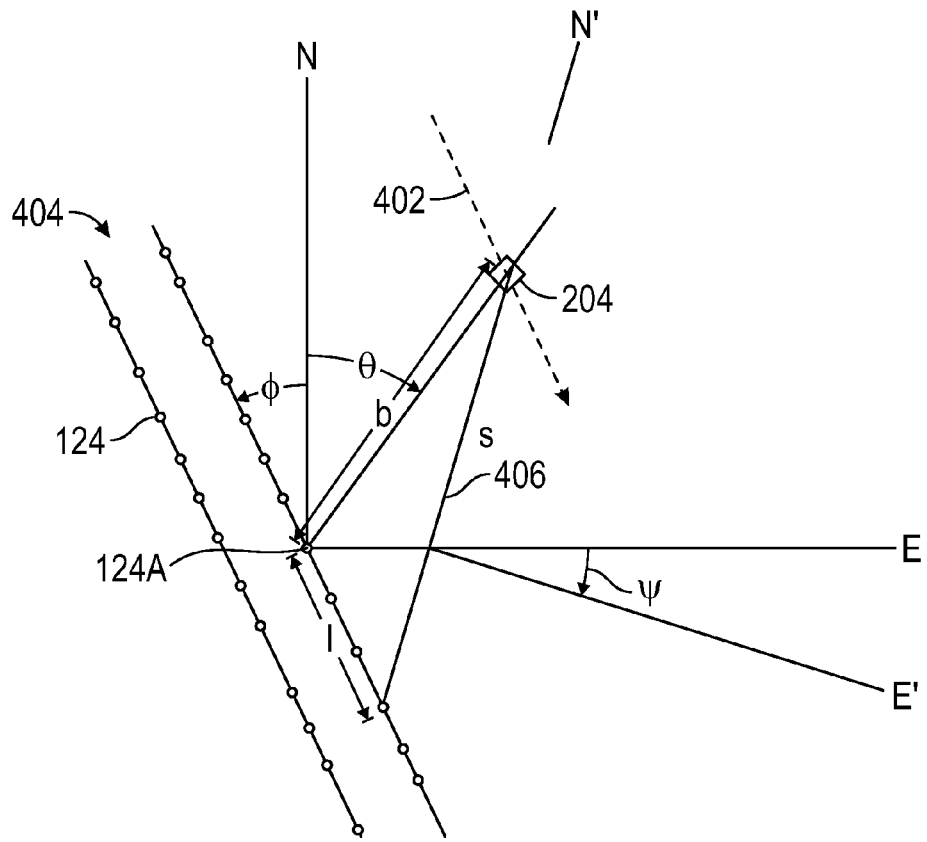
FIG. 4 shows another coordinate rotation associated with the methods of FIGS. 3, 5 and 6.

The transformation to a coordinate system based on the direction of the seismic acoustic wave propagation vector may be appreciated by referring to FIG. 4 illustrating an example coordinate transformation that may comprise a first stage of the generation of the aforesaid rotation matrix. FIG. 4 shows the N-E plane of the N,E,V coordinate system, which is the plane of the page. The V-axis may be understood to be perpendicular to the page. Consider a seismic source 204 being towed along a survey path 402 (shown dotted on FIG. 4). At any instant of time, the position of seismic source 204 as it is being towed is known. The position of seismic source 204 may have an angle, or bearing, Θ with respect to the N axis, which may, for example represent the direction North. Likewise, the distance, or range, δ, from an origin of the reference coordinate system is known. A sensor array 404, which may comprise a portion of one of sensor cables 114, 116, 118 and 120, may be disposed on the ocean bottom as described above in conjunction with FIG. 1, makes an angle Φ with respect to the N axis. Consider a seismic sensor 124A receiving a seismic acoustic signal from seismic source 204 having propagation path between seismic source 204 and seismic sensor 124A with a horizontal projection 406 on the N-E plane. The position of seismic sensor 124A is also known, and seismic sensor 124A may be a known distance/from the origin of the N,E,V coordinate system. The distance h represents the length of the propagation path horizontal projection 406. A rotated coordinate system, N', E', V' may be generated by a rotation of the N, E axes by an angle Ψ about the V-axis (which, being perpendicular to the page, does not appear in the view of FIG. 4). The rotation is generated such that the E'-axis is perpendicular to propagation path horizontal projection 406. An axis N' orthogonal to E' coincides with the direction of the horizontal projection 406. The rotation by the angle Ψ is analogous to the rotation by the angle α in FIG. 3A. From the known parameters Θ, Φ, /, and δ, the angle Ψ can be determined using Euclidean geometry, as can the distance h. The aforesaid rotation may be referred to as a radial-transverse rotation.

A second rotation, namely a rotation of the N'-E' plane about the E'-axis by the angle $\bar{\omega}$, may then be performed. The rotation by the angle $\bar{\omega}$ is analogous to the rotation by the angle β in FIG. 3A. This rotation may be referred to as an inclination angle rotation. The rotation angle $\bar{\omega}$ may be determined such that the N'-axis coincides with the direction of the propagation vector of the seismic acoustic wave between seismic source 204 and seismic sensor 124A. Representing the depth of the ocean bottom at the position of sensor array 404 by D, as shown in FIG. 1, and the depth of seismic source 204 by d, as shown in FIG. 2, the angle $\bar{\omega}$ may be determined from $\bar{\omega}$=atan(h/(D−d)), where atan represents the inverse tangent or arctangent function. The aforesaid rotation matrix may then be determined as the matrix multiplication of the rotation matrix for the rotation by the angle Ψ by the rotation matrix for the rotation by the angle $\bar{\omega}$. If the respective rotation matrices are denoted R(Ψ) and R($\bar{\omega}$) then the transformation matrix between the (N, E, V) coordinate system and the (N', E', V') coordinate system is R($\bar{\omega}$)·R(Ψ). These rotation matrices may then be used to transform the direction cosines of the seismic acoustic signal with respect to the components of a 3-C particle motion sensor onto the reference (N, E, V) coordinate system. Recall, the direction cosines are proportional to the output signals from the respective components of the 3-C particle motion sensor. Using the transformed direction cosines from successive positions of the seismic source 204, the orientation of the axes of the 3-C particle motion sensor, e.g. the (x, y, z) axes of FIG. 3A, may be determined relative to the reference, e.g. (N, E, V) coordinate system. The orientation thus defines a set of coordinate axes corresponding to the components of the 3-C particle motion sensor, e.g. the first set of coordinate axes in block 306, above, and similarly in methods 500 and 600 described in conjunction with FIGS. 5 and 6, respectively, below.

Figure 5:
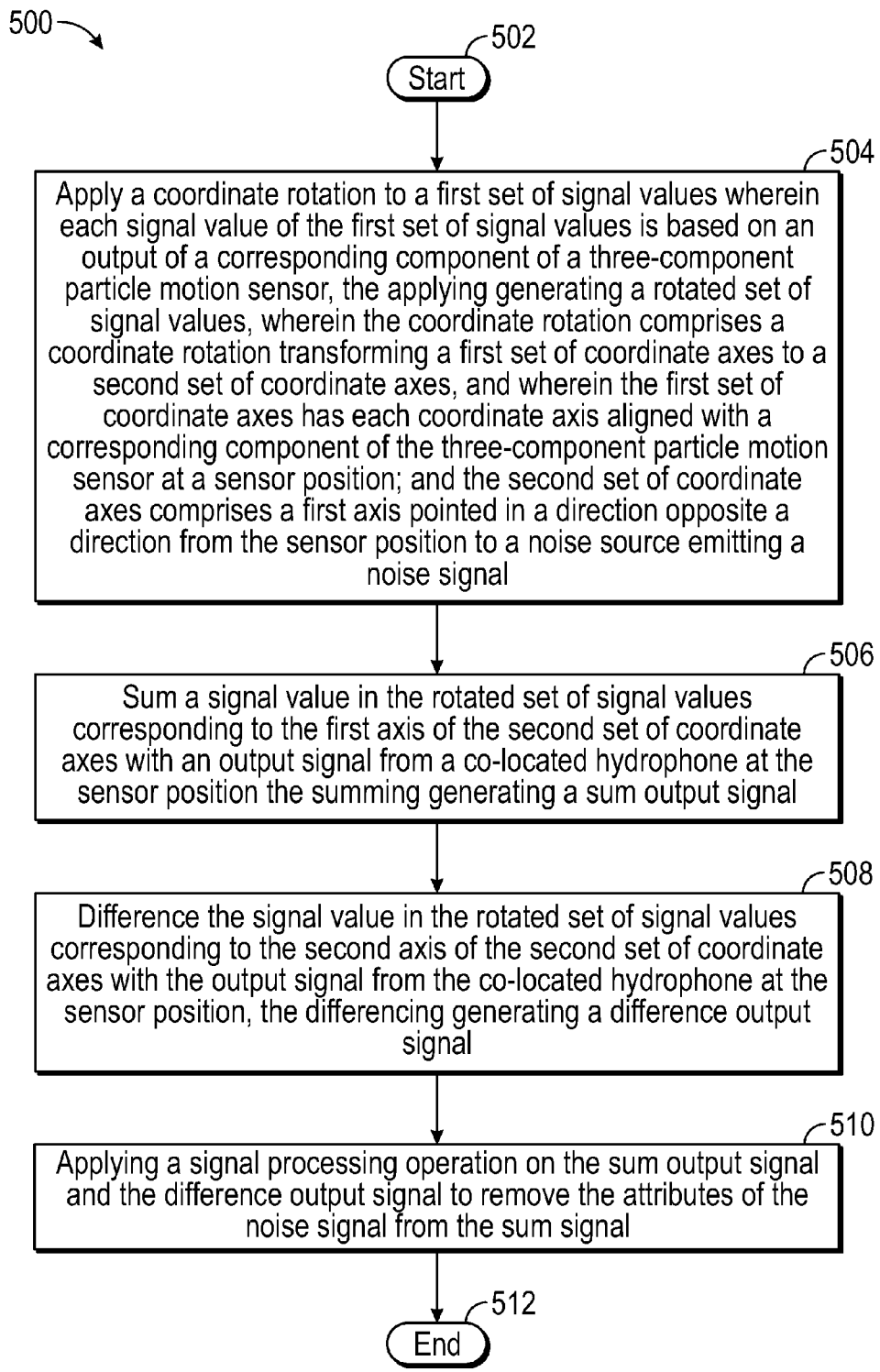
FIG. 5 shows a flow chart of a method in accordance with at least some embodiments.

As described above in conjunction with FIG. 1, one or more of sensor cables 114, 116, 118 and 120 may be left in place to facilitate repeat surveys of a hydrocarbon bearing reservoir 122 and/or monitor microseismic activity of the reservoir. In still other embodiments, monitoring of a hydrocarbon bearing reservoir 122 may be facilitated using a noise source, such as a drill platform 218, to ensonify the hydrocarbon bearing reservoir. A flow chart of a method 500 in accordance with the foregoing embodiment is shown in FIG. 5. Method 500 starts at block 502. In block 504, a coordinate rotation is applied to a first set of signal values, each signal value of the first set of signal values based on an output of a corresponding component of a three-component (3-C) particle motion sensor; the applied coordinate rotation generating a second set of signal values. The applied coordinate rotation comprises a coordinate rotation transforming a first set of coordinate axes to a second set of coordinate axes. Further, the first set of coordinate axes comprises a set of coordinate axes aligned with a corresponding component of the three-component particle motion sensor at the sensor position, and the second set of coordinate axes comprises a first axis pointed in a direction opposite a direction from the sensor position to a noise source emitting an acoustic noise signal, the coordinate rotation transforming the first set of coordinate axes to the second set of coordinate axes. In block 506, a signal value in the second set of signals corresponding to the first axis in the second set of coordinate axes is summed with an output signal from a co-located hydrophone at the sensor position, the summing generating a sum output signal. In block 508, the signal value in the second set of signals corresponding to the first axis in the second set of coordinate axes is differenced with the output signal from the co-located hydrophone at the sensor position, the differencing generating a difference output signal. In block 510, applying a signal processing operation to sum and difference signals to compress the acoustic noise signal to an effective scaled Klauder wavelet. Stated otherwise, the signal processing operation on the sum and difference signals operates on them to remove the attributes of the noise source from the sum signal and recover the response of the hydrocarbon bearing reservoir and/or associated subsurface formations. For example, the operation may comprise a cross-correlation of the sum signal and the difference signal, matched filtering of the signals, or de-convolution of the signals. However, other operations on the sum signal and difference signal that may be used with long duration signals to remove the attributes of a source signal from a response signal may be employed. Method 500 ends at block 512.

Similar to the method of FIG. 3, the orientation of the 3-C particle motion sensor at the sensor position may not be a priori known relative to a fixed reference coordinate system. However, it would be appreciated by persons of ordinary skill in the art with the benefit of the disclosure that the orientation may be determined based on the known location of a seismic source and the known sensor position as described in conjunction with FIG. 4.

Further, as described above in conjunction with FIG. 3, an obliquity scalar may be applied to an output of block 510.

However, it would be appreciated by those of ordinary skill in the art with the benefit of the disclosure, the angle of incidence of the reflected seismic acoustic signal may be different between an embodiment with the acoustic noise signal serving as the seismic source, and an embodiment having a towed seismic source such as seismic source 204.

Figure 6:
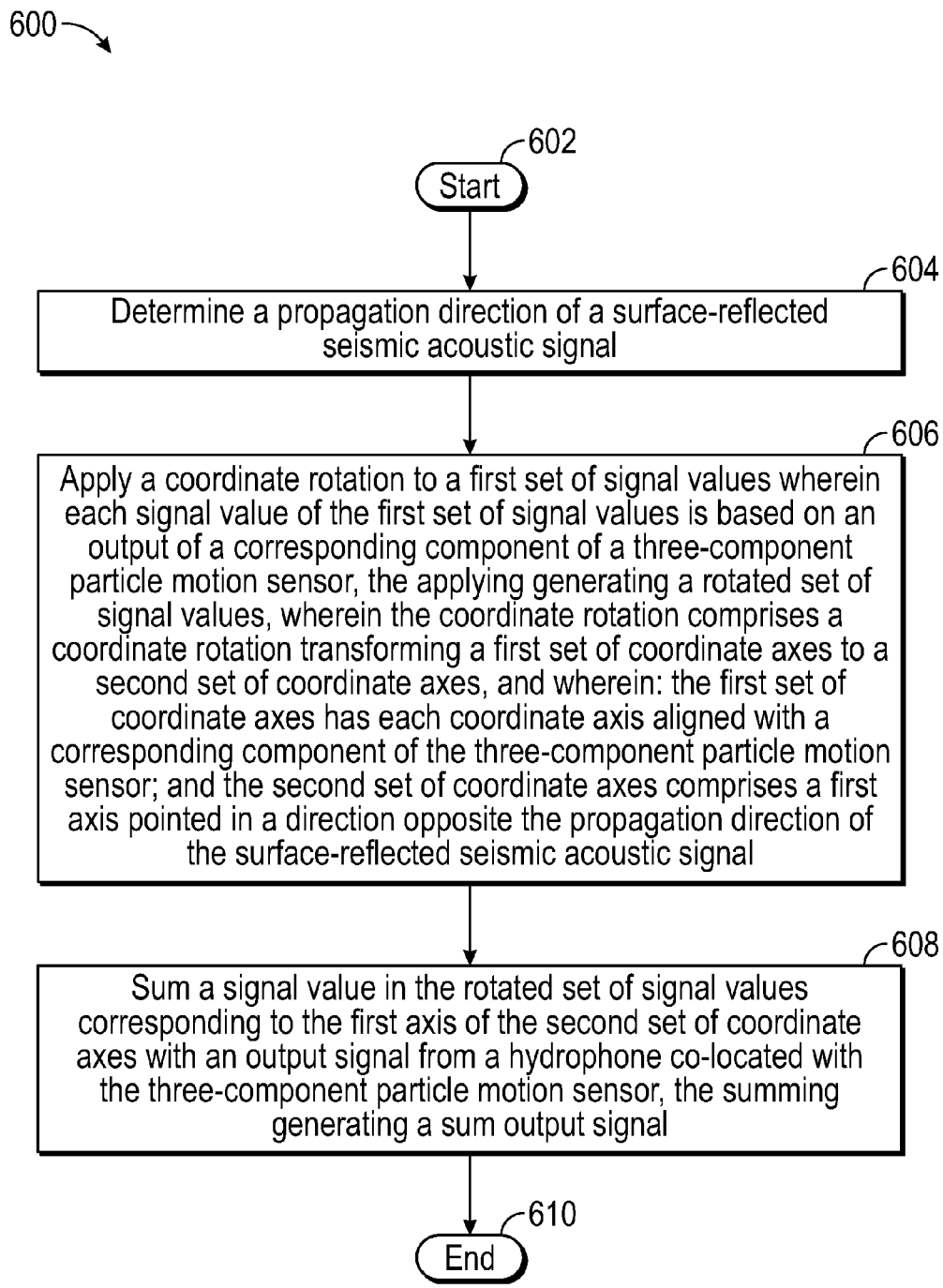
FIG. 6 shows a flow chart of a method in accordance with at least some embodiments.

In yet other embodiments, null-steering may be applied to separate out a surface-reflected seismic acoustic signal as described above in conjunction with FIG. 2B. Surface-related seismic acoustic signals may alternatively be referred to as surface-related multiples, free-surface multiples or water-layer multiples. FIG. 6 shows a flowchart of a method 600 for separating out a surface-reflected seismic acoustic signal. Method 600 starts at block 602. In block 604, a propagation direction of a surface-reflected seismic acoustic wave is determined. In block 606 a coordinate rotation is applied to a first set of signal values, each signal value of the first set of signal values based on an output of a corresponding component of a three-component (3-C) particle motion sensor; the applied coordinate rotation generating a second set of signal values. The applied coordinate rotation comprises a coordinate rotation transforming a first set of coordinate axes to a second set of coordinate axes. Further, the first set of coordinate axes comprises a set of coordinate axes aligned with a corresponding component of the three-component particle motion sensor, and the second set of coordinate axes comprises a first axis pointed in a direction opposite the direction of propagation of the surface-reflected seismic acoustic signal, the coordinate rotation transforming the first set of coordinate axes to the second set of coordinate axes. In block 608, a signal value in the second set of signals corresponding to the first axis in the second set of coordinate axes is summed with an output signal from a hydrophone co-located with the three-component particle motion sensor, the summing generating a sum output signal.

In at least some embodiments, the sum output signal may be scaled by an obliquity scalar based on a difference between an angle of incidence of a seismic acoustic signal reflected from a hydrocarbon bearing reservoir and a direction of maximum sensitivity of a sensor directivity pattern, in which the direction of maximum sensitivity is opposite the direction of propagation direction of the surface-reflected seismic acoustic signal. Similar to the methods of FIGS. 3 and 5, the orientation of the 3-C particle motion sensor at the sensor position may not be a priori known relative to a fixed reference coordinate system. However, it would be appreciated by persons of ordinary skill in the art with the benefit of the disclosure that the orientation may be determined based on the known location of a seismic source and the known sensor position as described in conjunction with FIG. 4.

In accordance with an embodiment of the invention, a geophysical data product may be produced. The geophysical data product may include information about the sum and/or difference signals obtained by methods described above, for example, the methods illustrated in FIG. 3, 5 or 6. The geophysical data product may be stored on a non-transitory, tangible computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States. Once onshore in the United States, geophysical analysis, including further data processing, may be performed on the geophysical data product.

Figure 7:
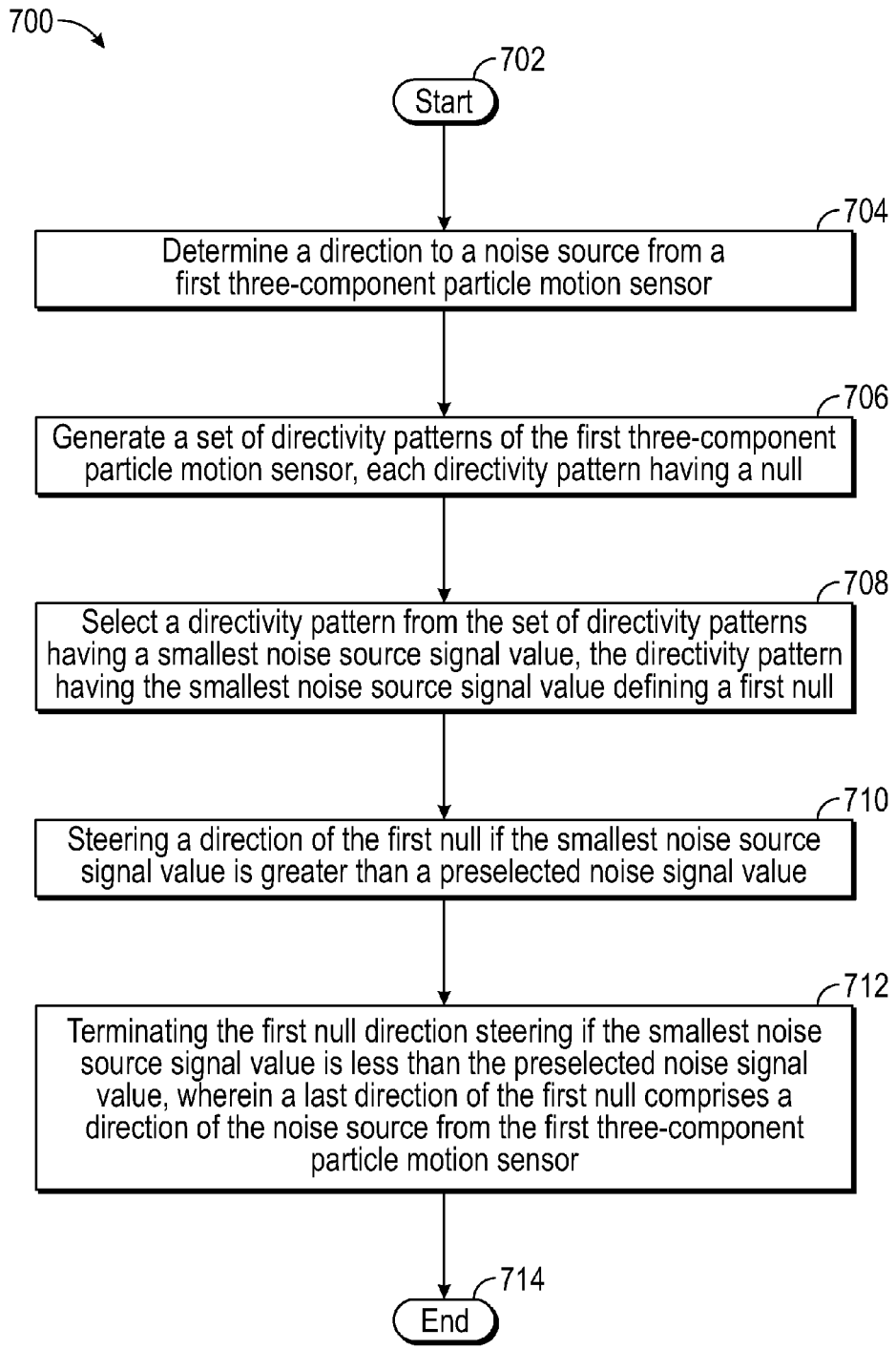
FIG. 7 shows a flow chart of a method in accordance with at least some embodiments.

In yet other exemplary embodiments, null steering may comprise a method to determine a direction to a source of noise, such as microseismic activity. FIG. 7 shows a flow chart of a method 700 to determine a direction to a noise source. Method 700 starts at block 702. In block 704, a direction from a first three-component particle motion sensor to a noise source is determined wherein, in block 706, a set of directivity patterns of the first three component particle motion sensor is generated, wherein each sensitivity pattern has a null. In block 708 a directivity pattern is selected from the set of directivity patterns having a smallest noise source signal value from the three-component particle motion sensor, the directivity pattern having the smallest noise source signal value defining a first null. Stated otherwise, the directivity pattern having the smallest noise source signal value from a first three-component sensor may have a null whose direction is most closely aligned with the direction from the first three-component particle motion sensor. In block 710, a direction of the first null is steered if the smallest noise source signal value is greater than a preselected noise source signal value. In other words, if the smallest noise signal value is sufficiently small, the direction of the first null may be sufficiently aligned with the direction to the noise source that further null steering may be omitted. The first null direction steering is terminated if the smallest noise source signal value is less than the preselected noise signal value, wherein a last direction of the first null comprises the direction of the first three-component particle motion sensor to the noise source, block 712. Method 700 ends at block 714.

For example, generating the directivity pattern may include summing a noise source signal value from each component of the set of noise source signals from the first three-component particle motion sensor and a noise source signal value from a hydrophone co-located with the first three-component particle motion sensor, the summing generating the first set of noise signal values. If the smallest noise signal value in the first set of sum noise signal values is less than a preselected noise signal value, the direction from the first three-component particle motion sensor to the noise source comprises the direction of the component of the three component sensor corresponding to the smallest noise signal value. Steering the direction of the first null may include applying a preselected coordinate rotation to the set of noise source signals from the first three-component particle motion sensor to generate a set of rotated noise signal values from the first three-component particle motion sensor, and summing each of the set of rotated noise signal values from the first three-component particle motion sensor with the noise source signal value from the hydrophone co-located with the first three-component particle motion sensor to generate another set of sum noise signal values based on the first three-component particle motion sensor. Terminating the first null direction steering may comprise terminating the first null direction steering if a smallest noise signal value in the set of summed noise signal values based on the first three-component particle motion sensor is less than the preselected noise signal value. Otherwise repeat the first null direction steering until the smallest noise signal value in the set of sum noise signal values based on the first three-component particle motion sensor is less than the preselected noise signal value. The direction from the first three-component particle motion sensor to the noise source may comprise a direction of the first null on terminating the steering of the direction of first null.

Directions to the noise source from each of a plurality of three-component particle motion sensors may similarly be determined. For example from a second three-component particle motion sensor, sum a noise source signal value from each component of the set of noise source signals from the second three-component particle motion sensor and a noise source signal value from a hydrophone co-located with the second three-component particle motion sensor to generate a second null, the summing generating the second set of noise signal values. If the smallest noise signal value in the second set of sum noise signal values is less than a preselected noise signal value, the direction from the second three-component particle motion sensor to the noise source comprises the direction of the component of the three component sensor corresponding to the smallest noise signal value. Steering the direction of the second null may include applying a preselected coordinate rotation to the set of noise source signals from the second three-component particle motion sensor to generate a set of rotated noise signal values from the second three-component particle motion sensor, and summing each of the set of rotated noise signal values from the second three-component particle motion sensor with the noise source signal value from the hydrophone co-located with the second three-component particle motion sensor to generate another set of sum noise signal values based on the second three-component particle motion sensor. Terminating the second null direction steering may comprise terminating the second null direction steering if a smallest noise signal value in the set of summed noise signal values based on the second three-component particle motion sensor is less than the preselected noise signal value. Otherwise repeat the second null direction steering until the smallest noise signal value in the set of sum noise signal values based on the second three-component particle motion sensor is less than the preselected noise signal value. The direction from the second three-component particle motion sensor to the noise source may comprise a direction of the second null on terminating the steering of the direction of second null.

Likewise a direction from a third three-component particle motion sensor by for example, summing a noise source signal value from each component of the set of noise source signals from the third three-component particle motion sensor and a noise source signal value from a hydrophone co-located with the third three-component particle motion sensor to generate a third null, the summing generating the third set of noise signal values. If the smallest noise signal value in the third set of sum noise signal values is less than a preselected noise signal value, the direction from the third three-component particle motion sensor to the noise source comprises the direction of the component of the three component sensor corresponding to the smallest noise signal value. Steering the direction of the third null may include applying a preselected coordinate rotation to the set of noise source signals from the third three-component particle motion sensor to generate a set of rotated noise signal values from the third three-component particle motion sensor, and summing each of the set of rotated noise signal values from the third three-component particle motion sensor with the noise source signal value from the hydrophone co-located with the third three-component particle motion sensor to generate another set of sum noise signal values based on the third three-component particle motion sensor. Terminating the third null direction steering may comprise terminating the third null direction steering if a smallest noise signal value in the set of summed noise signal values based on the third three-component particle motion sensor is less than the preselected noise signal value. Otherwise repeat the third null direction steering until the smallest noise signal value in the set of sum noise signal values based on the third three-component particle motion sensor is less than the preselected noise signal value. The direction from the third three-component particle motion sensor to the noise source may comprise a direction of the third null on terminating the steering of the direction of third null.

As discussed above in conjunction with FIG. 1, a sensor cable may have many hundreds of sensor devices, such as three-component particle motion sensors, disposed thereon. Thus, a determination of the location of the noise source, such as a source of microseismic activity, may be made by triangulating, i.e. determining the intersection of, the directions as determined in the previous examples, say, from three or more non-collinear three-component particle motion sensors.

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, although four ocean bottom sensor cables are shown, any number of sensor cables may be used. Further, while the co-located hydrophones and particle motion sensors are shown as discrete sensors, integrated devices may be used. It is intended that the following claims be interpreted to embrace all such variations and modifications.

What is claimed is:

1. A computer-implemented method comprising:
applying, by a computer system, a coordinate rotation to a first set of signal values, wherein each signal value of the first set of signal values is based on an output of a corresponding component of a three-component particle motion sensor at a sensor position, the applying generating a rotated set of signal values, wherein the coordinate rotation comprises a coordinate rotation transforming a first set of coordinate axes to a second set of coordinate axes, and wherein:
  the first set of coordinate axes having each coordinate axis aligned with a corresponding component of the three-component particle motion sensor at the sensor position; and
  the second set of coordinate axes comprises a first axis pointed in a direction opposite a direction from the sensor position to a noise source emitting an acoustic noise signal; and
summing, by the computer system, a signal value corresponding to the axis in the second coordinate system in the direction opposite the direction of the sensor position to the noise source with an output signal from a co-located hydrophone at the sensor position to generate a directivity null in the direction of the noise source, the summing generating a sum output signal;
differencing, by the computer system, the signal value corresponding to the axis in the second coordinate system in the direction opposite the direction of the sensor position to the noise source with an output signal from the co-located hydrophone at the sensor position to generate a directivity null opposite the direction of the noise source, the differencing generating a difference output signal; and applying, by the computer system, a signal processing operation on the sum output signal and the difference output signal to remove the attributes of the noise source from the sum output signal.

2. The computer-implemented method of claim 1 wherein applying the signal processing operation on the sum output signal and the difference output signal comprises cross-correlating the sum output signal and the difference output signal, the signal processing operation generating a recovered signal.

3. The computer-implemented method of claim 1 further comprising determining the direction from the sensor position to the noise source emitting an acoustic noise signal.

4. The computer-implemented method of claim 1 further comprising determining an orientation of the three-component particle motion sensor.

5. A method of manufacturing a geophysical data product, comprising:
applying, by a computer system, a coordinate rotation to a first set of signal values, wherein each signal value of the first set of signal values is based on an output of a corresponding component of a three-component particle motion sensor at a sensor position, the applying generating a rotated set of signal values, wherein the coordinate rotation comprises a coordinate rotation transforming a first set of coordinate axes to a second set of coordinate axes, and wherein:
the first set of coordinate axes having each coordinate axis aligned with a corresponding component of the three-component particle motion sensor at the sensor position; and
the second set of coordinate axes comprises a first axis pointed in a direction opposite a direction from the sensor position to a noise source emitting an acoustic noise signal; and summing, by the computer system, a signal value corresponding to the axis in the second coordinate system in the direction opposite the direction of the sensor position to the noise source with an output signal from a co-located hydrophone at the sensor position to generate a directivity null in the direction of the noise source, the summing generating a sum output signal;

differencing, by the computer system, the signal value corresponding to the axis in the second coordinate system in the direction opposite the direction of the sensor position to the noise source with an output signal from the co-located hydrophone at the sensor position to generate a directivity null opposite the direction of the noise source, the differencing generating a difference output signal; and applying, by the computer system, a signal processing operation on the sum output signal and the difference output signal to remove the attributes of the noise source from the sum output signal;

recording the sum output signal on a tangible computer-readable medium.

6. The method of claim 5 wherein applying the signal processing operation on the sum output signal and the difference output signal comprises cross-correlating, by the computer system, the sum output signal and the difference output signal, the signal processing operation generating a recovered signal.

7. The method of claim 5 further comprising determining the direction from the sensor position to the noise source emitting an acoustic noise signal.

8. The computer-implemented method of claim 5 further comprising determining an orientation of the three-component particle motion sensor.

9. In a method of imaging an underground formation beneath a body of water in which sensor data collected from three-component particle motion sensors is subject to coordinate rotation to align with a predetermined North, East, Vertical (NEV) coordinate system, and then data associated with each three-component particle motion sensor is combined with the data from respective co-located hydrophones, wherein the specific computer-implemented improvement comprises, for each three-component particle motion sensor:
determining, by a computer system, a direction from a three-component particle motion sensor to a noise source;
performing, by the computer system, a coordinate rotation on a first set of signal values, wherein each signal value of the first set of signal values is based on an output of a corresponding component of the three-component particle motion sensor, the coordinate rotation creates a rotated set of signal values in which a first axis aligns with the direction from the three-component particle motion sensor to the noise source;
summing, by the computer system, a signal value in the rotated set of signal values corresponding to the first axis with an output signal from a hydrophone co-located with the three-component particle motion sensor to generate a null in directional sensitivity along the first axis in the direction of the noise source, the null in directional sensitivity having an attenuation of 21 deciBels (dB) or greater, and the summing generates a sum output signal;
differencing, by the computer system, the signal value in the rotated set of signal values corresponding to the first axis with the output signal from the hydrophone to generate a null in directional sensitivity opposite the direction of the noise source, the differencing generating a difference output signal;
reducing, by the computer system, attributes of the noise source from the sum output signal by applying a signal processing operation on the sum output signal and the difference output signal.

10. The computer-implemented method of claim 9 further comprising scaling the sum output signal based on a difference between an angle of incidence of a seismic acoustic signal reflected from a hydrocarbon bearing reservoir and a direction opposite the null in directional sensitivity.

11. The computer-implemented method of claim 9 further comprising scaling at least one of the output signal from the co-located hydrophone and the rotated set of signal values prior to the summing, wherein the scaling normalizes magnitude of the rotated set of signal values and the output signal from the co-located hydrophone.

* * * * *